Figures 1, 2:
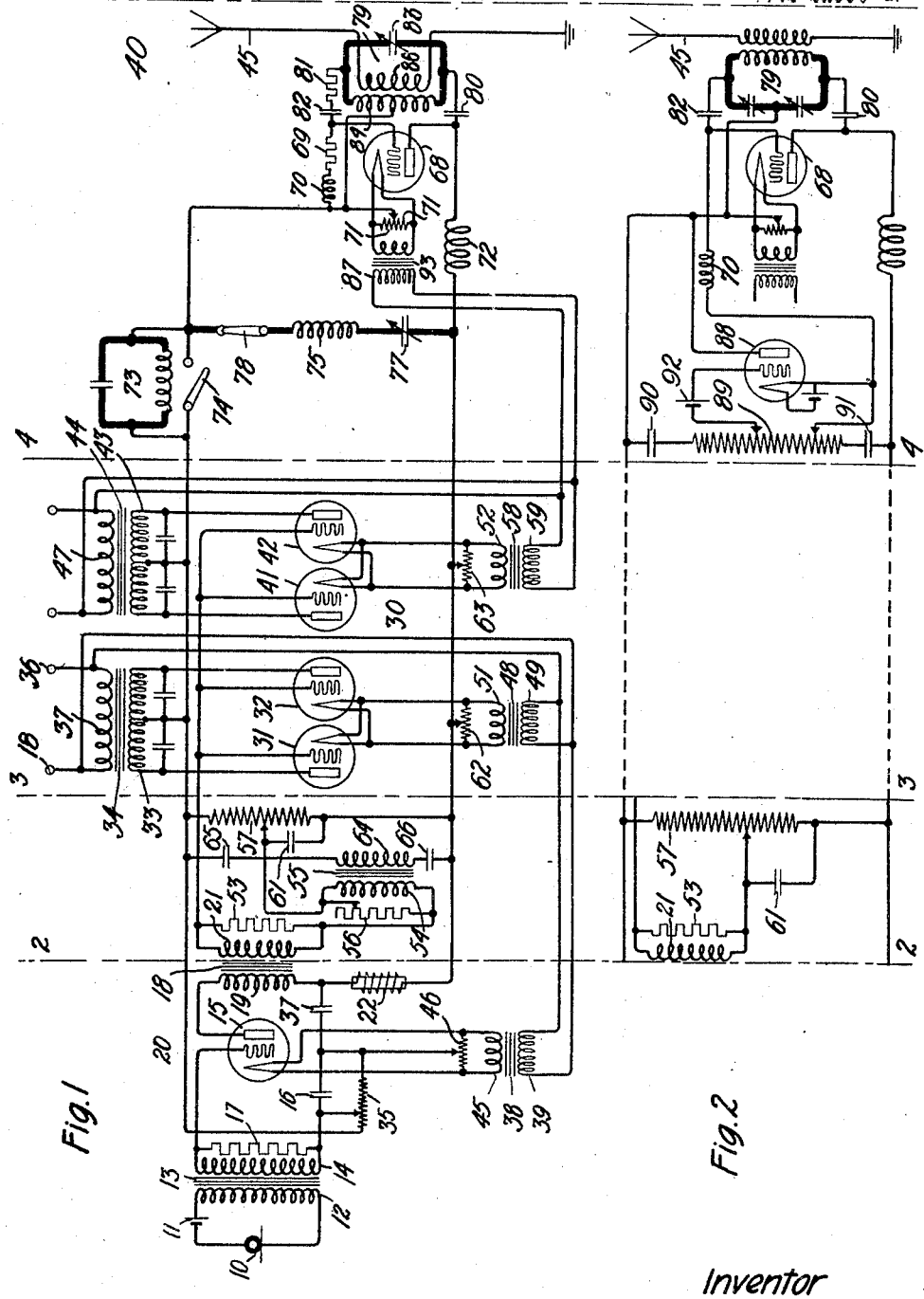

Nov. 8, 1927.

A. G. LANDEEN 1,647,998

ELECTRIC ENERGY TRANSLATION SYSTEM

Original Filed Dec. 12, 1923   2 Sheets-Sheet 1.

Inventor
Arvid G. Landeen
by [signature] Atty.

Nov. 8, 1927. 1,647,998
A. G. LANDEEN
ELECTRIC ENERGY TRANSLATION SYSTEM
Original Filed Dec. 12, 1923 2 Sheets-Sheet 2

Inventor
Arvid G. Landeen
by ℰ.W.Adams Atty.

Patented Nov. 8, 1927.

1,647,998

UNITED STATES PATENT OFFICE.

ARVID G. LANDEEN, OF CALDWELL, NEW JERSEY, ASSIGNOR TO WESTERN ELECTRIC COMPANY, INCORPORATED, OF NEW YORK, N. Y., A CORPORATION OF NEW YORK.

ELECTRIC-ENERGY-TRANSLATION SYSTEM.

Application filed December 12, 1923, Serial No. 680,167. Renewed November 30, 1926.

This invention relates to electric energy translation systems.

An object of the invention is to translate electric energy as a means of signaling. Another object of the invention is to utilize alternating currents as power supply sources in electric wave transmission systems and to reduce the detrimental effects of ripples resulting from the rectification of the alternating currents.

A further object of this invention is to rectify alternating currents and to suppress pulsations or ripples remaining in the rectified current.

A more specific object of the invention is to utilize polyphase alternating currents as sources of space current, filament heating current and grid potential in a vacuum tube modulating system.

Another object of the invention is to utilize two-phase power as a source of supply of energy for a vacuum tube modulating system and to suppress ripples resulting therefrom.

A feature of the invention relates to a vacuum tube modulator supplied with power from a polyphase source by means of balanced rectifiers having means for suppressing ripples in the rectified current.

Another feature of the invention relates to means connected to the grid electrodes of vacuum tube rectifiers for impressing thereon potentials varying at the frequency of ripples in the rectified current but in out of phase relation thereto whereby the ripples are substantially eliminated.

Another feature of the invention relates to a vacuum tube oscillator supplied with power from a rectifier connected to an alternating current source which oscillator has a variable grid leak arranged to suppress ripples in the current supply by varying the grid potential of the oscillator in the proper manner.

This invention may be embodied in a modulating system comprising a source of signals, a source of high frequency oscillations, and a modulator. The modulator is interposed between the signal source and source of oscillation and is supplied with power from a source of two-phase alternating current. It comprises pairs of vacuum tubes symmetrically connected to the source of current. This modulator acts as a rectifier and supplies two-phase current to the oscillator and to a speech amplifier connected to a transmitter constituting the source of signals. The speech amplifier acts under the control of the transmitter to vary the grid potential of the modulator tubes and thus causes variations in the potential of the rectified current supplied to the oscillator in a manner well known. An antenna is coupled to a tuned circuit in the oscillator for radiating speech modulated energy.

Various means are provided to suppress ripples in the rectified current, for example, by impressing potentials on the rectifier grids in out of phase relation to the ripple components or by providing tuned circuits for offering high impedance to the ripple frequency. In one instance a transformer has its primary winding arranged to receive current of the ripple frequency and its secondary connected to impress potentials varying at this frequency on the grids of the rectifier tubes at a phase 180° from that of the ripples in the rectified current whereby they are suppressed.

Current from the rectifier-modulator is also used to produce the proper polarizing potential upon the grid electrodes of the speech amplifier and the modulator tubes. The filaments of all the tubes of the system are heated from the same source of alternating current. No batteries are required in the system other than that used to supply energy to the transmitter.

Various embodiments of this invention are illustrated in the drawings to wit:

Fig. 1, a radio transmitting system utilizing two-phase rectified current with means for suppressing ripples in the rectified current.

Fig. 2, circuit modifications that may be substituted for corresponding portions of Fig. 1.

Figure 3:
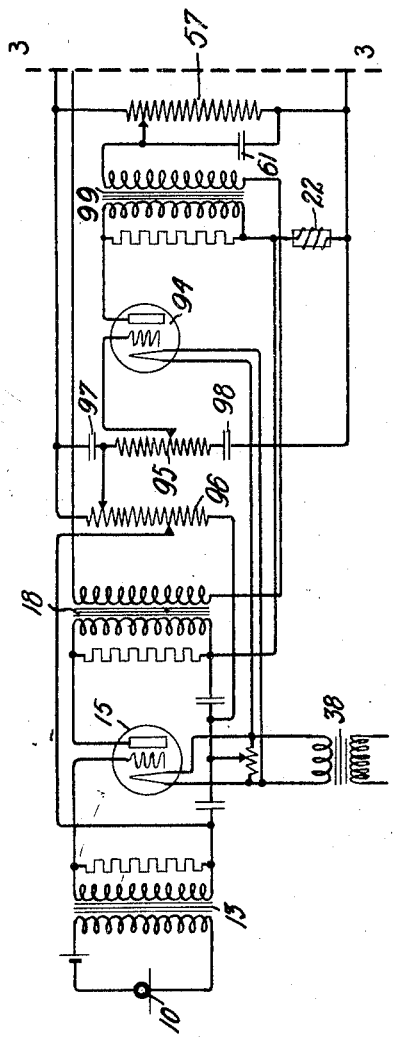

Fig. 3, an amplifier which may be incorporated in the circuit of Fig. 1 for suppressing ripples.

Figure 4:
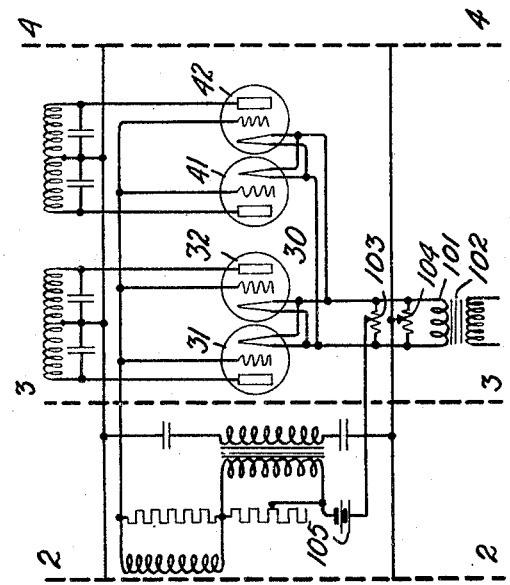

Fig. 4, a modification of the rectifier filament heating circuit of Fig. 1.

In the drawings like reference characters have been used throughout the various figures to indicate similar parts.

The modulating system of Fig. 1 comprises a microphone 10, which typifies any source of speech frequency waves, a speech frequency amplifier 20, a rectifier modulator 30, an oscillator 40, and an antenna 45. Connected in series with the microphone 10 is a battery 11, and a primary winding 12 of a transformer 13. The amplifier 20 comprises a three electrode vacuum tube 15 which has an input circuit connected between its grid and filament. This input circuit includes the secondary winding 14 of the transformer 13 in series with a condenser 16 and in shunt a stabilizing impedance 17 which may be of non-inductive resistance.

An output circuit of amplifier 20 is connected between its filament and plate and may be traced from the plate of tube 15, the primary winding 19 of an output transformer 18 in series with a choke coil 22 through the space current paths of tubes 31, 32, 41 and 42 in parallel to the secondary windings 33 and 43 of alternating current power transformers 34 and 44, resistance 35, divided resistance 46, to the filament of tube 15. A condenser 37 is connected between the plate and filament of tube 15 to supply a path in shunt to the space current supply circuit of the tube for the varying or alternating current components.

The filament of tube 15 is supplied with heating current by a transformer 38. The primary winding 39 of the transformer is connected to terminals 18 and 36 arranged to be connected to one-phase of a source of two-phase alternating current. The secondary winding 45 is connected in series with the filament of tube 15. Resistance 46 is connected in shunt to the winding 45 and has a mid tap whereby the input and output circuits of the tube may be connected to a point which has the same alternating potential as the midpoint of the filament.

Rectifier modulator 30 comprises two pairs of vacuum tubes 31, 32, 41 and 42. Tubes 31 and 32 have their plate electrodes connected to opposite terminals of the secondary winding of transformer 34, whereas tubes 41 and 42 have their plate electrodes connected to opposite terminals of the primary winding 43 of transformer 44. Primary 37 of transformer 34 connects to one phase of the source of two phase alternating current, whereas primary winding 47 of transformer 44 is connected to the second phase of the same source of current. The midpoint of secondaries 33 and 43 connect to a common output circuit. The respective halves of each winding are shunted by condensers designed to offer high impedance to current from the power source but to offer low impedance to currents within the range of frequency of the signals.

The filaments of tubes 31 and 32 are connected in parallel to the terminals of secondary winding 51 of transformer 48 the primary winding 49 of which is connected in parallel with the primaries 39 and 37 to the one phase of the source of two phase alternating current. The filaments of tubes 41 and 42 are connected in a similar manner to the secondary winding 52 of the transformer 58, the primary winding 59 of which is connected in parallel with the primaries 47 and 87 of transformers 48 and 93 to the second phase of the source of alternating current. The grids of tubes 31, 32, 41 and 42 are all connected to a common input circuit. This circuit may be traced from the grids of these tubes, secondary winding of transformer 18 in parallel with resistance 53, secondary winding 54 of transformer 55 in parallel with resistance 56, the portion of resistance 57 shunted by condenser 61, divided resistances 62 and 63 in parallel to the filaments of tubes 31, 32, 41 and 42.

As a means of impressing potentials of the ripple frequencies on the grids of the rectifier modulator tubes, the primary winding 64 of transformer 55 is connected between condensers 65 and 66 across the common output circuit of the rectifier tubes. The condensers permit the passage of alternating current but prevent the passage of direct current.

The oscillator 40 comprises a vacuum tube 68 having an input circuit connected across its grid and filament and an output circuit connected across its filament and plate. The input circuit comprises a grid leak resistance 69 and a choke coil 70 in series with the divided resistance 71. The latter is in shunt to the secondary winding of transformer 93 which supplies heating current to the filament. The output circuit of tube 68 may be traced as follows: plate of tube 68, choke coil 72, resistance 62 and 63 in parallel through the filament plate paths of tubes 31, 32, 41 and 42 in parallel to branch circuits through the secondary windings 33 and 43 of transformers 34 and 44, resonant circuit 73, resistance 71 to the filament of tube 68. A switch 74 is provided for short circuiting the resonant circuit 73. A series resonant circuit comprising an inductance 75 and a variable condenser 77 in series is connected in shunt to a portion of the output circuit by means of the switch 78. The function of these resonant circuits is to aid in suppressing the ripples in the rectified current in a manner which will be explained more fully later.

The oscillator 40 has a resonant circuit 79 connected between the input and output circuits of tube 68 and in series therewith on the plate side of the tube is the condenser 80 and on the grid side of the tube resistance 81 and a condenser 82. The resonant circuit 79 comprises a variable condenser 83 and an inductance 84. The mid point of the latter is connected to the filament of tube 68 through the resistance 71. The inductance 84 is coupled to the inductance coil 86 connected between the aerial 45 and ground.

In the operation of the system of Fig. 1, two phase alternating current applied to the primary windings of transformers 34 and 44 is rectified by means of tubes 31, 32, 41 and 42. This rectified current is applied to the output circuit of amplifier 20 and to the plate circuit of oscillator 40.

It is found that there are ordinarily present, in the rectified current, variations of relatively small amplitude, which are termed ripples, and which have frequencies that are harmonics of the frequency of the alternating current connected to the transformers 34 and 44. Of these harmonics the fourth is perhaps the most pronounced. In order to eliminate the ripples, this system provides an anti-resonant circuit 73 connected in series with the output circiut of the oscillator 40 tuned to the harmonic frequency which it is desired to suppress, namely the fourth harmonic. This circuit therefore offers high impedance to the ripple currents. The series tuned circuit 75, 77 is also tuned to either the same or some other harmonic frequency and serves to shunt around the space path of the tube 68 current of the frequency to which it is tuned and thus to prevent variations of this frequency in the current supply of this tube.

As a means of further preventing ripples in the rectified current, potentials are impressed upon the grids of the rectifier tubes having variations of the frequency of the ripples but in an out-of-phase relation therewith so that the variations of this frequency in the rectified current are substantially eliminated. The means used to impress these potentials upon the grids of the rectifier tubes comprises the transformer 55. The primary winding 64 of this transformer is connected so as to receive potentials corresponding to ripple components of the rectified current. The condensers 65 and 66 permit the passage of the varying components of the rectified current, but prevent the passage of the direct current components. thus there results in the secondary winding of transformer 55 a corresponding alternating electromotive force having a frequency the same as that of the ripples of the rectified current. The varying electromotive forces in the circuit connected to the secondary 54 of transformer 55 are impressed across the grids and filaments of tubes 31, 32, 41 and 42 at a phase opposite to that of the corresponding variations produced in the output circuits of these tubes. The result of this is that the variations in the rectified current are substantially eliminated.

Resistance 57 which is also connected in parallel to the output circuit of the rectifier, has a portion of its length included in the grid filament circuit of the rectifiers and by means of the potential drop along this portion of the resistance, a proper average potential may be maintained upon the grids of these tubes. Condenser 61 is connected in shunt to the portion of the resistance mentioned in order to maintain more nearly a constant potential difference thereacross. The amount of resistance included in the grid filament circuit may be varied by means of the variable contact.

A resistance 35, a portion of which is common to the input and output circuits of tube 15, is connected in series with the space path of tube 15 across the output circuit of the rectifier 30 and produces by means of the drop in potential along the portion of its length included in the amplifier input circuit a suitable average polarizing potential upon the grid of tube 15.

A variable resistance 56 connected in shunt to the secondary winding 54 of transformer 55 is provided to enable the voltage of the transformer to be adjusted with respect to that of transformer 18 in order that ripple variations impressed upon the grid of rectifier modulator tubes may also be suppressed.

Oscillations are generated in the oscillator 40, which is of a well known type. A resistance 81 connected in series with the resonant circuit 86 is designed to prevent singing. The condenser 82 connected in series with this resistance prevents the flow of current leaking from the grid of tube 68 through the resonant circuit 86. Resistance 69 constitutes a grid leak path between the filament and grid of this tube. The reactance of the choke coil 70 prevents the flow of oscillatory current in this circuit. Condenser 80 connected in the lead between resonant circuit 89 and the plate of tube 68 prevents the passage of direct current from the rectifier through the resonant circuit. Choke coil 72 together with coil 70 prevents the passage of oscillatory current of the frequency generated by the oscillator 40 from traversing the output circuit of the rectifier 30.

The varying current produced by microphone 10 causes variations in the potential of the grid of tube 15. These potential variations control the impedance of the space path of this tube, whereby corresponding variations in the flow of current in the circuit connected thereto are produced. Similar variations in the potentials applied to the grids of the rectifier modulator tubes are produced by means of the transformer 18. Consequently, the amplitudes of the voltages produced across the filaments and plates of these tubes are modified in accordance with the signals. These potentials are impressed upon the filament-plate circuit of tube 68 in such manner as to cause the amplitude of oscillations generated in the system to be varied accordingly. Energy having signal modulations is thus transmitted to antenna 45 from which it is radiated.

In Fig. 2, circuit modifications are shown which may be substituted for the portions of the circuit of Fig. 1 included within the same dotted lines. The portion of the circuit of Fig. 2 included between the dotted lines 2—2 and 3—3 is similar to the corresponding portion of the circuit of Fig. 1 with the omission of transformer 55, resistance 56 and condensers 65 and 66.

The portion of Fig. 2 shown at the right of the dotted line 4—4 is a modification of the oscillator 40. The series resonant circuits 75 and 77 and the resonant circuit 73 have been omitted in this circuit and a vacuum tube 88 substituted therefor to perform substantially the same function, namely, to suppress the ripples in the rectified current supplied to the oscillator. The space path between plate and filament of tube 88 forms a variable grid leak for the grid of tube 68 and is connected in series between the filament and grid of tube 68 with a choke coil 70 included to prevent oscillatory current from flowing in this circuit.

Resistance 89 connected between two condensers 90 and 91 respectively is shown across the output circuit of the rectifier 30. The condensers 90 and 91 permit the passage of ripple frequencies but prevent the passage of direct current therethrough. A portion of resistance 89 is included between the filament and grid of tube 88 in series with a grid polarizing battery 92. Variations in the grid potential corresponding to the frequencies of the ripples in the rectified current are produced by the changes in the drop of potential along the portion of the resistance 89 included in this circuit. Consequently the impedance of the space path of tube 88 undergoes similar variations and thus variably impedes the current leaking from the grid of tube 68. The potential of the grid of tube 68 will vary in accordance with the variations of the current. The phase of these variations is so adjusted with respect to the phase of ripples in the rectified current supplied to the plate circuit of tube 68 that these ripples are substantially eliminated. The desired phase relation is obtained by properly connecting and adjusting resistance 89 and by providing a battery 92 of proper potential.

The portion of the circuit shown in Fig. 3 may be substituted for the portion of the circuit of Fig. 1 at the left of the dotted line 3—3. A feature of this circuit is the voltage amplifier tube 94 which has its grid and filament connected across the portions of resistances 95 and 96. The resistance 95 is connected between condensers 97 and 98 and in shunt to the output circuit of the rectifiers. The condensers 97 and 98 permit the passage of ripple current through the resistance 95 but prevent the passage of direct current therethrough. Ripples variataions in the resistance cause corresponding variations in the potential of the grid of tube 94 whereby the impedance of the tube is caused to vary accordingly. The space path to tube 94 is included in series with the primary winding of transformer 99 and also in series with a portion of resistance 96 across the output circuit of the rectifier 30. The variations of impedance in this circuit introduced by tube 94 cause variations of current in the transformer primary. By this means varying electromotive forces are produced in the secondary winding of transformer 99 and are impressed in series with speech variations from transformer 18 upon the grids of the vacuum tubes 31, 32, 41 and 42.

Resistance 57 has the portion of its circuit which is shunted by condenser 61 included in the above circuit and serves to supply a proper average polarizing potential to the grid of the rectifier tubes. The condenser 61 is provided to maintain a constant unidirectional potential across the portion of the resistance which it shunts.

The resistance 96 serves to provide a suitable polarizing potential for the grids of tubes 15 and 94. The operation of the circuit of Fig. 1 having the portion shown in Fig. 3 substituted for the portion at the left of the dotted line 3—3 is substantially the same as described previously.

In Fig. 4, a modification of the portion of the circuit of Fig. 1 included between the lines 2—2 and 4—4 is shown. This figure shows the filaments of the tubes 31, 32, 41 and 42 all connected in parallel to the secondary winding 101 of a transformer 102 which may have its secondary connected to either phase of the source of two phase alternating current. A resistance 103 corresponding in function to the resistances 62 and 63 of Fig. 1 is shunted across the secondary winding 101 and an additional resistance 104 is also shunted across this winding and serves as a separate return path for the current from the plate circuit of the oscillator 40. In this modification, the resistance 57 shown in Fig. 1 to obtain a polarized potential on the grids of tubes 31, 32, 41 and 42 has been omitted and a grid polarizing battery 105 substituted therefor to supply the desired potential.

Although various specific embodiments have been illustrated and described it is to be understood that these are merely representative of the principles of this invention. It will be apparent to persons skilled in the art that numerous other embodiments and species may be substituted for the particular ones herein shown without departing from the scope of this invention. For example, the microphone 10 may as well be any other device for producing variations of current of signalling frequency. Antenna 45 may likewise be replaced by a transmission line or other similar conductor or by a receiving circuit. The scope of this invention is only as limited as defined by the appended claims.

What is claimed is:

1. The method of producing speech varied rectified current from a plurality of phases of alternating current by means of space discharge devices having main discharge electrodes and control elements, which comprises variably rectifying in accordance with speech a plurality of phases of said current, combining the rectified current, separating out therefrom undesired ripple variations, and impressing said ripple variations upon said control elements in ripple neutralizing phase relation.

2. In an electric energy translation system, a source of two-phase current, a space discharge rectifier connected to said source, a space discharge amplifier and an oscillator supplied with current from said rectifier, and means for eliminating harmonics from said current, said means comprising an anti-resonant circuit tuned to a harmonic frequency in series with said oscillator and a series resonant circuit in shunt thereto.

3. An electric energy translation system which comprises a source of signals, an amplifier controlled by said signals, a modulator comprising vacuum tubes symmetrically connected to a source of polyphase current connected to said amplifier, an oscillator controlled by said modulator, said oscillator being coupled to a transmitting conductor and a transformer traversed by current from said modulator and said amplifier for impressing potentials on the grids of said modulator to produce signal modulations and to suppress ripples in the current therefrom.

4. In a modulating system a space discharge rectifier connected to a source of polyphase current, a space discharge amplifier connected to a source of signals, and a space discharge oscillator coupled to an antenna, said amplifier and oscillator having certain of their circuits connected mutually in parallel, means for heating the filaments of said space discharge devices from a common source of polyphase current, and means coupled to said amplifier and to said oscillator for offering high impedance to harmonics resulting from the use of polyphase current.

5. A modulator which comprises a plurality of three electrode space discharge devices having a common input circuit and a common output circuit, a source of plural-phase current connected to said output circuit, means in said input circuit to impress potentials on the grids of said devices to compensate for harmonic variations in the current in said output circuit, and additional means in said output circuit to selectively impede harmonic variations in the current flowing therein.

6. A modulator which comprises a space discharge rectifier, input and output circuits therefor, a source of two-phase current connected to said rectifier, means in said input circuit to impress potentials corresponding to signal variations on control electrodes of said rectifier, and additional means in said input circuit to impress harmonic variations of potential on said grids in out-of-phase relation to similar harmonic variations of current in said output circuit whereby said variations of current are substantially eliminated.

7. In a modulating system, a rectifier for two-phase electric currents, a source of signals arranged to control the energy output of said rectifier, an oscillator supplied with current from said rectifier, and means for suppressing ripples in the current supplied to the oscillator, said means comprising a parallel resonant circuit in series with said oscillator and a series resonant circuit in shunt to said oscillator.

8. In a modulating system, a vacuum tube rectifier, having grid and plate electrodes, input and output circuits connected to the grid and plate electrodes respectively of said rectifier, means for impressing signal variations on said input circuit, and means traversed by varying components of current in said output circuit to impress additional variations on said input circuit 180° out of phase with the variation in said output circuit whereby the latter variations are substantially eliminated.

9. In a modulating system, a source of signals, a source of oscillations and a rectifier connected to a plurality of phases of current for supplying energy to said source of oscillations, and means for suppressing from said rectified current the harmonics or multiple frequency whose ordinal is equal to the number of phases, said means comprising a transformer in an input circuit of said rectifier, and a plurality of resonant circuits in an output circuit thereof.

10. In an electric wave transmission system, a source of signals and a source of oscillations, an antenna supplied with energy of said oscillations, a vacuum tube device for rectifying polyphase current as the source of supply of energy for said oscillations said vacuum tube device being controlled by said signals, a transformer having its primary connected to the output circuit of said rectifying device, and a plurality of resonant circuits connected to said output circuit for eliminating ripples in the current supplied to said source of oscillations.

11. In an electric energy translation system, a rectifier connected to a source of a plurality of phases of alternating current, a vacuum tube amplifier and a vacuum tube oscillator supplied with space current from said rectifier, means associated with said rectifier for suppressing harmonic variations in the rectified current, and means traversed by said rectified current for independently impressing a polarizing potential on the grid electrodes of said amplifier and said rectifier.

12. In a rectifying system, a source of polyphase electric current, a plurality of discharge tubes, at least one to each phase, connected to said source, means connected to said source for impressing a polarizing potential on the grids of said discharge tubes, means connected to said source for supplying heating current to the filaments of said tubes, and means for applying potentials to the grids of said tubes to compensate for harmonics in the rectified current.

13. In an electric wave transmission system, a source of two-phase current, a discharge tube rectifier having an output circuit and a control circuit connected to said source, a discharge tube amplifier and an oscillator supplied with current from said rectifier, and means for eliminating harmonics from said current, said means comprising a discharge tube amplifier having its input circuit connected to the output circuit of said rectifier and having its output circuit connected to said control circuit.

14. In a rectifier, a source of polyphase electric current, a plurality of discharge tubes having grid, plate and filament electrodes symmetrically connected to said source, said tubes having a common input circuit connected to said grids and a common output circuit connected to said plate electrodes, and means controlled by the variable component of current in said output circuit connected to said input circuit for substantially eliminating said variable component of current.

15. In a modulating system a source of signals, a polyphase rectifier controlled by said source, a discharge tube oscillator supplied with current from said rectifier and a variable grid leak for said oscillator comprising the space path of a discharge tube to compensate for harmonics in the rectified current.

16. In an electric energy translation system a vacuum tube rectifier for polyphase current, an oscillator supplied with current from said rectifier, said oscillator having a grid or control element and means connected to the control element of said oscillator to impress harmonic potential thereon in out-of-phase relation to similar harmonics in the rectified current, said means comprising a three electrode vacuum tube having its control element connected to the output circuit of said rectifier.

17. In combination, a space discharge device, means for supplying alternating current to said device, a second space discharge device, means for supplying to said second device, alternating current of different phase from that supplied to said first mentioned device, a common input circuit and a common output circuit for said devices, and means for coupling said circuits including an adjustable resistance.

18. In a rectifying system, a plurality of space discharge tubes connected to a polyphase source of current, means for heating the filaments of said tubes from said source, a space discharge oscillator supplied with current from said rectifier, and means comprising a resistance and a plurality of condensers, one of said condensers and a portion of said resistance being connected in common in the input and output circuits of said rectifier whereby ripples in the rectified current are substantially eliminated.

19. In a radio transmitting system, a source of signals, a full wave polyphase rectifier including a plurality of three electrode space discharge tubes, a common input circuit connected to control electrodes and a common output circuit connected to anodes of said tubes, a space discharge repeater including electrodes having the space path thereof included in said output circuit, said source of signals being coupled to said input circuit, and means, comprising an aperiodic loop, included in both said input and output circuits for eliminating ripples.

20. In a modulating system, a source of signals, a polyphase rectifier comprising a plurality of space discharge devices having input and output circuits, a load circuit supplied with energy from said rectifier, and means for suppressing ripples in the rectified current comprising an impedance connected directly in shunt to the load circuit, less than all of said impedance being connected in said input circuit.

In witness whereof, I hereunto subscribe my name this 30th day of November A. D., 1923.

ARVID G. LANDEEN.